United States Patent
Shaw et al.

(10) Patent No.: US 10,791,356 B2
(45) Date of Patent: Sep. 29, 2020

(54) SYNCHRONISATION OF STREAMED CONTENT

(71) Applicant: Piksel, Inc., Wilmington, DE (US)

(72) Inventors: Philip Shaw, York (GB); Peter Heiland, Dover, MA (US); Sean Everett, New York, NY (US); Mark Christie, London (GB); Kristan Bullett, York (GB); Ralf Tilmann, Manheim (DE); Hans-Jurgen Maas, Mainz (DE)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/736,934

(22) PCT Filed: Jun. 15, 2016

(86) PCT No.: PCT/EP2016/063800
§ 371 (c)(1),
(2) Date: Dec. 15, 2017

(87) PCT Pub. No.: WO2016/202886
PCT Pub. Date: Dec. 22, 2016

(65) Prior Publication Data
US 2018/0184138 A1 Jun. 28, 2018

Related U.S. Application Data

(60) Provisional application No. 62/175,878, filed on Jun. 15, 2015.

(51) Int. Cl.
*H04N 7/173* (2011.01)
*H04N 21/262* (2011.01)
(Continued)

(52) U.S. Cl.
CPC ...... *H04N 21/26233* (2013.01); *H04H 60/46* (2013.01); *H04L 65/607* (2013.01);
(Continued)

(58) Field of Classification Search
None
See application file for complete search history.

(56) References Cited

U.S. PATENT DOCUMENTS 6,788,333 B1 * 9/2004 Uyttendaele ....... H04N 5/23238
348/36
7,110,025 B1 * 9/2006 Loui ..................... H04N 5/232
348/220.1
(Continued)

FOREIGN PATENT DOCUMENTS

WO 2007117613 A2 10/2007
WO 2012100114 A2 7/2012

OTHER PUBLICATIONS

International Search Report and Written Opinion for Application PCT/EP2016/063800 issued by the European Patent Office, dated Oct. 10, 2016.
(Continued)

*Primary Examiner* — William J Kim
(74) *Attorney, Agent, or Firm* — Holzer Patel Drennan

(57) ABSTRACT

There is described a system for providing streaming services, comprising: a plurality of capture devices each for generating a stream of an event, each stream being associated with a timing reference; and a server for analysing the plurality of captured streams in order to align the received plurality of received captured streams according.

20 Claims, 7 Drawing Sheets

(51) Int. Cl.

| | | |
|---|---|---|
| *H04N 21/231* | (2011.01) | |
| *H04N 21/232* | (2011.01) | |
| *H04N 21/235* | (2011.01) | |
| *H04N 21/24* | (2011.01) | |
| *H04N 21/242* | (2011.01) | |
| *H04N 21/2665* | (2011.01) | |
| *H04N 21/2668* | (2011.01) | |
| *H04N 21/4223* | (2011.01) | |
| *H04N 21/43* | (2011.01) | |
| *H04N 21/4402* | (2011.01) | |
| *H04N 21/442* | (2011.01) | |
| *H04N 21/482* | (2011.01) | |
| *H04N 21/6332* | (2011.01) | |
| *H04N 21/84* | (2011.01) | |
| *H04N 21/8547* | (2011.01) | |
| *H04N 21/433* | (2011.01) | |
| *H04N 21/443* | (2011.01) | |
| *H04N 21/81* | (2011.01) | |
| *H04N 21/2343* | (2011.01) | |
| *H04N 21/8358* | (2011.01) | |
| *H04N 21/414* | (2011.01) | |
| *H04N 21/218* | (2011.01) | |
| *H04N 21/2187* | (2011.01) | |
| *H04N 21/633* | (2011.01) | |
| *H04H 60/46* | (2008.01) | |
| *H04N 21/234* | (2011.01) | |
| *H04L 29/06* | (2006.01) | |
| *H04N 21/254* | (2011.01) | |
| *H04N 21/266* | (2011.01) | |
| *H04N 21/258* | (2011.01) | |

(52) U.S. Cl.
CPC ... *H04N 21/2187* (2013.01); *H04N 21/21805* (2013.01); *H04N 21/232* (2013.01); *H04N 21/235* (2013.01); *H04N 21/2343* (2013.01); *H04N 21/2353* (2013.01); *H04N 21/2358* (2013.01); *H04N 21/23106* (2013.01); *H04N 21/23418* (2013.01); *H04N 21/23439* (2013.01); *H04N 21/234336* (2013.01); *H04N 21/2402* (2013.01); *H04N 21/242* (2013.01); *H04N 21/2407* (2013.01); *H04N 21/2541* (2013.01); *H04N 21/25866* (2013.01); *H04N 21/2665* (2013.01); *H04N 21/2668* (2013.01); *H04N 21/26208* (2013.01); *H04N 21/26613* (2013.01); *H04N 21/414* (2013.01); *H04N 21/41407* (2013.01); *H04N 21/4223* (2013.01); *H04N 21/433* (2013.01); *H04N 21/4305* (2013.01); *H04N 21/4307* (2013.01); *H04N 21/4331* (2013.01); *H04N 21/4334* (2013.01); *H04N 21/44029* (2013.01); *H04N 21/4431* (2013.01); *H04N 21/44204* (2013.01); *H04N 21/440236* (2013.01); *H04N 21/440263* (2013.01); *H04N 21/4828* (2013.01); *H04N 21/633* (2013.01); *H04N 21/6332* (2013.01); *H04N 21/8186* (2013.01); *H04N 21/8358* (2013.01); *H04N 21/84* (2013.01); *H04N 21/8547* (2013.01)

(56) References Cited

U.S. PATENT DOCUMENTS

| | | | | |
|---|---|---|---|---|
| 8,872,910 | B1* | 10/2014 | Vaziri | G02C 11/10 348/78 |
| 8,938,089 | B1* | 1/2015 | Postelnicu | G06K 9/00744 382/100 |
| 9,344,751 | B1* | 5/2016 | Ream | H04N 21/242 |
| 2004/0056879 | A1* | 3/2004 | Erdelyi | G06F 17/30793 715/716 |
| 2005/0081138 | A1* | 4/2005 | Voss | G06F 17/30817 715/200 |
| 2005/0123201 | A1* | 6/2005 | Nakashima | G06K 9/3241 382/195 |
| 2007/0201815 | A1* | 8/2007 | Griffin | G11B 27/034 386/231 |
| 2007/0250863 | A1* | 10/2007 | Ferguson | H04H 20/106 725/46 |
| 2008/0138040 | A1* | 6/2008 | Ieda | H04N 5/232 386/236 |
| 2009/0087161 | A1* | 4/2009 | Roberts | G11B 27/031 386/282 |
| 2009/0132583 | A1* | 5/2009 | Carter | G06F 17/30038 |
| 2009/0148124 | A1* | 6/2009 | Athsani | G06Q 30/02 386/241 |
| 2009/0323802 | A1* | 12/2009 | Walters | H04H 60/04 375/240.01 |
| 2010/0077289 | A1* | 3/2010 | Das | G06F 17/30265 715/230 |
| 2010/0134662 | A1* | 6/2010 | Bub | H04N 1/195 348/266 |
| 2010/0225811 | A1* | 9/2010 | Konvisser | G06F 17/30041 348/512 |
| 2010/0290519 | A1* | 11/2010 | Jeong | H04N 19/44 375/240.01 |
| 2011/0052136 | A1* | 3/2011 | Homan | H04N 21/242 386/201 |
| 2012/0113121 | A1* | 5/2012 | Luo | G06F 17/30247 345/440 |
| 2012/0114296 | A1* | 5/2012 | Luo | H04N 9/8205 386/224 |
| 2012/0114307 | A1* | 5/2012 | Yang | G06F 17/30256 386/278 |
| 2012/0192242 | A1* | 7/2012 | Kellerer | G06F 17/30817 725/116 |
| 2012/0198317 | A1* | 8/2012 | Eppolito | G11B 27/034 715/202 |
| 2012/0314077 | A1* | 12/2012 | Clavenna, II | H04N 21/2187 348/159 |
| 2013/0162902 | A1* | 6/2013 | Musser, Jr. | G11B 27/10 348/515 |
| 2013/0326573 | A1* | 12/2013 | Sharon | H04H 60/59 725/115 |
| 2013/0339539 | A1* | 12/2013 | Scherlis | H04N 21/235 709/231 |
| 2014/0079372 | A1* | 3/2014 | Zhang | G06K 9/00765 386/241 |
| 2014/0169766 | A1* | 6/2014 | Yu | H04N 5/76 386/282 |
| 2014/0281011 | A1* | 9/2014 | Zarom | H04L 65/602 709/231 |
| 2015/0043892 | A1* | 2/2015 | Groman | H04N 21/47205 386/278 |
| 2015/0187389 | A1* | 7/2015 | Horita | G11B 27/036 386/264 |
| 2015/0310891 | A1* | 10/2015 | Pello | G11B 20/10287 369/47.16 |
| 2017/0238055 | A1* | 8/2017 | Chang | H04N 13/204 725/19 |
| 2017/0359612 | A1* | 12/2017 | Kuplevakhsky | H04N 21/266 |

OTHER PUBLICATIONS

Hesselman, Cristian, et al., "Sharing Enriched Multimedia Experiences Across Heterogeneous Network Infrastructures", IEEE Communications Magazine, vol. 48, No. 6, Jun. 1, 2010.

Murray, Kevin, et al., "TM-CSS0017r7:TM-SM-CSS-0017 Companion Screens and Supplementary Streams Report", Digital Video Broadcasting, (DVB), Geneva Switzerland, Feb. 18, 2013.

(56) References Cited

OTHER PUBLICATIONS

Examination Report issued by the European Patent Office dated Feb. 26, 2019 for corresponding EP Patent Application 16729570.8.

* cited by examiner

SYNCHRONISATION OF STREAMED CONTENT

BACKGROUND TO THE INVENTION

Field of the Invention

The present invention relates to the synchronisation of content streamed from several sources, and preferably but not exclusively to the synchronisation of content streamed for live consumption.

Description of the Related Art

It is known in the art to provide content streamed from individual devices for consumption by other devices. In particular it is known in the art that consumption devices may consume content which is streamed from multiple other devices.

It is an aim to provide improvements to the delivery of content from multiple capture sources, particularly when the content is streamed from the multiple capture sources.

SUMMARY OF THE INVENTION

There is provided a system for providing streaming services, comprising: a plurality of capture devices each for generating a stream of an event, each stream being associated with a timing reference; and a server for analysing the plurality of captured streams in order to align the received plurality of received captured streams according.

The server may be configured to process the captured streams and generating at least one viewing stream, the system further comprising at least one viewing device for receiving the at least one viewing stream.

The server may be configured to analyse the plurality of captured streams by deriving the timing reference within each of the plurality of captured streams. The server derives (identifies) a common timing reference within each of the plurality of captured data streams. The captured data streams may thus have a common timing reference. That is, that the captured data streams capture a common event so that they may provide a common reference which can be used as a common timing reference. As the common timing reference may have a different relative position within the plurality of captured data streams, the server may analyse the streams to derive the common timing reference within each stream and align them accordingly.

Ones of the plurality of captured streams or segments of the plurality of captured data streams from different capture devices associated with the same event may be synchronised by the server.

A sound signature is derived as the timing reference in the captured data stream from each capture device. A visual signature is derived as the timing reference in the captured data stream from each capture device.

At least one capture device may generate two streams of the same event, one having a higher quality than the other, wherein the two streams are each associated with a timing reference, wherein the relative position of one stream can be aligned with the relative position of the other stream at the server based on the derivation of the respective timing marks at the server.

The timing reference may provide a time line for the stream, wherein the server analysis aligns the time line for each stream, so that each stream is aligned.

A device may be provided performing the stream analysis, such as a server.

There is provided a method for providing streaming services, comprising: generating a plurality of streams of an event from a plurality of capture devices, each stream being associated with a timing reference; and receiving the plurality of captured streams at a server; and analysing the captured streams at the server in order to align the received plurality of received captured streams according.

The method may further comprise processing the captured streams and generating at least one viewing stream, the method further comprising receiving at least one stream at one or more viewing devices.

The method may further comprise configuring the server to analyse the plurality of captured streams by deriving the timing reference within each of the plurality of captured streams. The method may further include the server deriving (identifying) a common timing reference within each of the plurality of captured data streams. Thus in each captured data stream a common timing reference may be provided.

Ones of the plurality of captured streams or segments of the plurality of captured data streams from different capture devices associated with the same event may be synchronised by the server.

A sound signature may be derived as a timing reference in the captured data stream for each device. A visual signature nay be derived as a timing reference in the captured data stream for each device.

Each device, for example, is unaware that other devise are seeing/hearing he same event. It is only when the server analyses the aggregated content that these common audio/visual features are identified.

The method may further comprise generating at at least one capture device two streams of the same event, one having a higher quality than the other, wherein the two streams are each associated with a timing reference, the server being configured to align the position of one stream with respect to the position of the other stream.

The method may further comprise providing a time line for the stream with the timing reference, and analysing the time line for each stream to align each stream.

In examples there is provided a method comprising: receiving a plurality of video streams from a plurality of capture devices; synchronising two or more video streams in time; and providing the time synchronised video streams for further processing.

Processing may comprise storing the synchronised video streams or transmitting the synchronised video streams, e.g. delivering them to viewing devices.

The video streams may be received from a plurality of independent capture devices. The independent capture devices communicate with a server, and therefore viewing devices, via a public network (e.g. the Internet) which have different and uncontrolled bandwidths which vary in time due to uncontrolled variations in the network connections for the individual devices. Thus, there is provided an uncontrolled and unmanaged environment.

The independence of the capture devices is two-dimensional: each capture devices is independent of each other, and each capture device is independent of a server to which it delivers video streams.

Each capture device may be provided with a master clock, and video stream generated by each capture device may include a timing mark associated with the master clock, such that each received video stream includes a timing mark associated with the master clock, and the method comprises adjusting the timing of one or more received video streams such that each video stream is synchronised in time.

The method may comprise identifying a common image in multiple video streams, identifying the timing position of the common image in each video stream, and adjusting the timing of each video stream such that the timing position of the common images is synchronised. The common image may be a video extract or an image upon which text recognition may be based. Visible clocks may be provided, and times in the visible clocks utilised for synchronisation.

The method may comprising recovering a fingerprint from each received video stream, identifying the timing position of each fingerprint in each video stream, and adjusting the timing of each video stream such that the timing positions of each fingerprint are coincident.

In examples there is provided, in a system comprising a plurality of capture devices for capturing video images, and a server for receiving video streams from each of the plurality of capture devices, wherein the capture of video images by the capture devices is independent, a method comprising synchronising the video received from capture devices at the server.

Where both a high-quality video stream and a low quality video stream are received, a plurality of low-quality video streams may be synchronised and independently a plurality of high-quality video streams may be synchronised. The synchronised low and high quality video streams may be processed together. The synchronised low and high quality video streams may be processed together.

There may be a known time offset between high quality streams and low quality streams, which time offset may be fixed. A time offset may be used to time align a low quality stream or streams with a high quality stream or streams. In particular when a high quality stream and a low quality stream are received from the same capture device, a known time offset may be used to align them. In alternatives, a time offset may be used to incorporate a delay between delivering the low-quality and high-quality streams to viewing devices.

Edit decisions made using the low quality stream may be transposed to the high quality stream.

BRIEF DESCRIPTION OF THE FIGURES

The invention is now described by way of reference to the following figures, in which.

DESCRIPTION OF PREFERRED EMBODIMENTS

Figure 1:
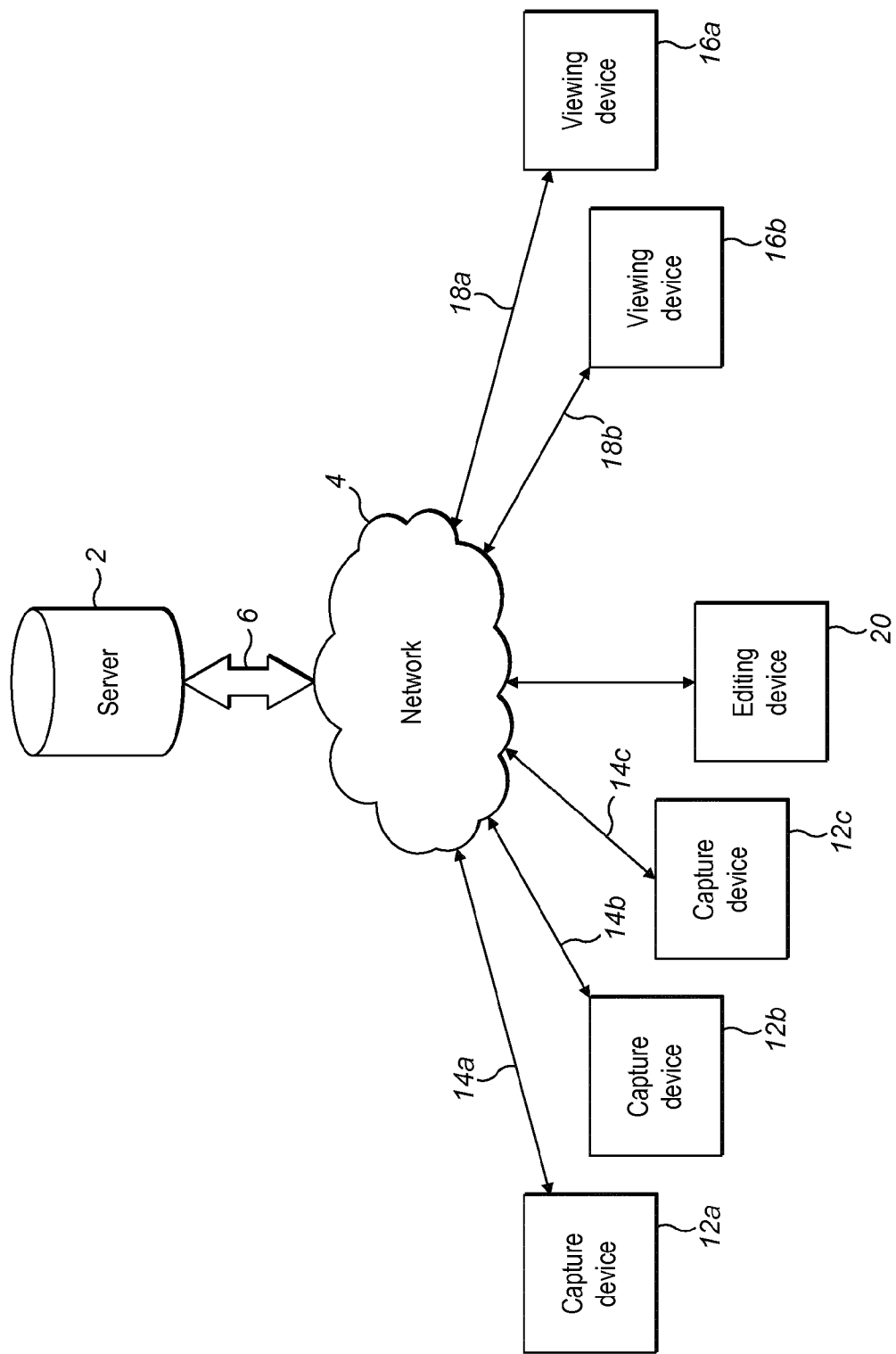
FIG. 1 illustrates an example architecture in which further examples as described may be implemented.

With reference to FIG. 1 there is illustrated a system architecture within which embodiments may be implemented.

With reference to FIG. 1 there is illustrated: a plurality of devices, labelled capture devices, denoted by reference numerals 12a, 12b, 12c; a plurality of devices, labelled viewing devices, denoted by reference numerals 16a, 16b; a device, labelled editing device, denoted by reference numeral 20a; a network denoted by reference numeral 4; and a server denoted by reference numeral 2.

Each of the devices 12a, 12b, 12c is referred to as a capture device as in the described embodiments of the invention the devices capture content. However the devices are not limited to capturing content, and may have other functionality and purposes. In examples each capture device 12a, 12b 12c may be a mobile device such as a mobile phone.

Each of the capture devices 12a, 12b, 12c may capture an image utilising a preferably integrated image capture device (such as a video camera), and may thus generate a video stream on a respective communication line 14a, 14b, 14c. The respective communication lines 14a, 14b, 14c provide inputs to the network 4, which is preferably a public network such as the Internet. The communication lines 14a, 14b, 14c are illustrated as bi-directional, to show that the capture devices 12a, 12b, 12c may receive signals as well as generate signals.

The server 2 is configured to receive inputs from the capture devices 12a, 12b, 12c as denoted by the bi-directional communication lines 6, connected between the server 2 and the network 4. In embodiments, the server 2 receives a plurality of video streams from the capture devices, as the signals on lines 14a, 14b, 14c are video streams.

The server 2 may process the video streams received from the capture devices as will be discussed further hereinbelow.

The server 2 may generate further video streams on bi-directional communication line 6 to the network 4, to the bi-directional communication lines 18a, 18b, associated with the devices 16a, 16b respectively.

Each of the devices 16a, 16b is referred to as a viewing device as in the described embodiments of the invention the devices allow content to be viewed. However the devices are not limited to providing viewing of content, and may have other functionality and purposes. In examples each viewing device 16a, 16b may be a mobile device such as a mobile phone.

The viewing devices 16a and 16b may be associated with a display (preferably an integrated display) for viewing the video streams provided on the respective communication lines 18a, 18b.

A single device may be both a capture device and a viewing device. Thus, for example, a mobile phone device may be enabled in order to operate as both a capture device and a viewing device.

A device operating as a capture device may generate multiple video streams, such that a capture device such as capture device 12a may be connected to the network 4 via multiple video streams, with multiple video streams being provided on communication line 14a.

A viewing device may be arranged in order to receive multiple video streams. Thus a viewing device such as viewing device 16a may be arranged to receive multiple video streams on communication line 18a.

A single device may be a capture device providing multiple video streams and may be a viewing device receiving multiple video streams.

Each capture device and viewing device is connected to the network 4 with a bi-directional communication link, and thus one or all of the viewing devices 16A, 16B may provide a signal to the network 6 in order to provide a feedback or control signal to the server 2. The server 2 may provide control signals to the network 4 in order to provide control signals to one or more of the capture devices 12a, 12b, 12c.

The capture devices 12a, 12b, 12c are preferably independent of each other, and are independent of the server 2. Similarly the viewing devices 16a, 16b are preferably independent of each other, and are independent of the server 2.

The capture devices 12a, 12b, 12b are shown in FIG. 1 as communicating with the server 2 via a single network 4. In practice the capture devices 12a, 12b, 12c may be connected to the server 2 via multiple networks, and there may not be a common network path for the multiple capture devices to the server 2. Similarly the viewing devices 16a, 16b may be connected to the server 2 via multiple networks, and there may not be a single common network path from the server 2 to the viewing devices 16a, 16b.

The system architecture of FIG. 1 may be used to stream live content from capture devices to the server, and then for viewing devices to access the live content in streams from the server.

Figure 2:
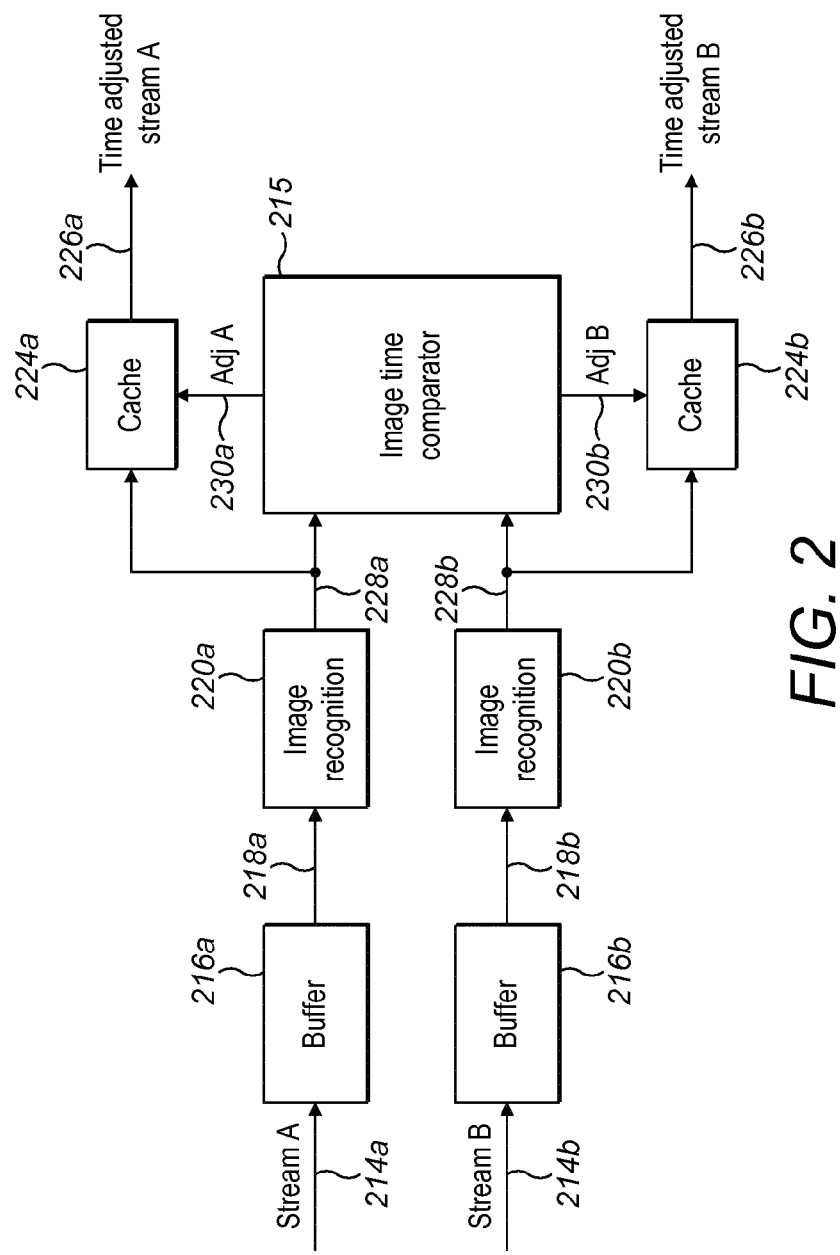
FIG. 2 illustrates an example implementation for synchronisation based on image recognition.

FIGS. 2 and 3 illustrate that at a streaming server such as the server 2 of FIG. 1, in an example a synchronisation of incoming streams may be determined based on image recognition.

It is desirable to synchronise the clocks on a collection of devices not connected to each other but each connected to a server over an unknown, unknowable, unreliable network (i.e. the internet), and FIGS. 2 and 3 illustrate an example technique for achieving clock accuracy that is potentially accurate.

Events that capture content using a high frame rate or where frame-accuracy is important may need a carefully attuned clock such that the order of magnitude in the uncertainty is manageable.

Any solution that relies on a device contacting a server over the internet will run into the issue of being able to measure the round trip time between the two but being then unable to break this down into outward and return journey times—information that is vital to being able to synchronise exactly.

In order to improve on this accuracy for devices that are near each other a different technique must be provided.

Imagine a simple example in which two smart phones are setup next to each other to capture video. Their clocks are not synchronised and they are connected to the internet over an unstable cellular connection. Consider also that they are both looking at a digital clock that shows the time in hours, minutes and seconds.

A remote viewer, receiving the streams from the two phones, could very easily align them so that they were synchronised simply by observing the times shown on the clock and by watching for the moment the seconds value ticked over.

A similar, albeit more sophisticated approach is presented here. The goal of synchronisation is not to align a set of capture devices with a remote clock—that is one method by which things can be synchronised, but it is not the objective. The goal is to play out each captured stream so that as each frame plays out, it is shown alongside frames from other streams captured at the same moment. In this way, if the capture devices can all be aligned in some way, their synchronisation (or lack thereof) with the time at the central server is largely irrelevant.

To achieve this synchronisation, it is proposed to look for markers that are common to each stream, or a series of markers common to overlapping subsets of the streams.

In the simple example above, the digital clock is the marker, but in an alternative real-world situation a marker might consist of a TV image caught in the background, the position of a moving object a camera flash; or a sound such as the start of a song, a round of applause, the text a speaker is reading, a starting pistol; or an electronic beacon like a Bluetooth ping.

Each capture device, being situated in the same time domain as the marker can safely assume that they heard/saw the event at the same time. Having identified and described the marker, they can compare the state of their clocks at this moment and calculate the matrix of their relative offsets. This matrix need only be evaluated once for any unique selection of capture devices. It would only need to be done again if a new device joined the event.

Sound markers may be picked out using frequency spectrum analysis with the profile of interesting events used to compare markers between devices. Video analysis could likewise be used to achieve a similar result.

Bluetooth pings offer a unique possibility in that they can be produced by a device at will rather than having to wait for a marker to occur naturally. Moreover, particularly with Bluetooth Low Energy, timings for data in transit are well known. While such broadcasts are limited in range, it would be possible to create ad-hoc cells of nearby devices which synchronised amongst themselves first and then between cells secondarily. Sound is the least reliable marker source when used in large open spaces as the speed of sound becomes a significant overhead. Text recognition within video data could be used to look for digital clocks appearing in frame.

Earlier, it is mentioned the possibility of using a number of overlapping markers to synchronise a large number of devices. A set of devices can be set to form a synchronisation group if they share access to a common marker, but some members of the set may also share markers with other groups and in this way synchronisation between groups/cells may be achieved.

With further reference to FIG. 2, the server 2 includes first and second buffers 216a and 216b, first and second image recognition modules 220a and 220b, an image time comparator module 215, and first and second cache modules 224a and 224b.

As illustrated in FIG. 2, first and second streams referred to as Stream A and Stream B are received on connection lines 214a and 214b. Each is input to a respective one of the buffers 216a and 216b, which provides an output on respective lines 218a and 218b to a respective image recognition module 220a and 220b.

The respective image recognition modules 220a and 220b detect the presence of an image, or identify a predetermined image.

Each image recognition module 220a and 220b provides the recognised image on respective lines 228a and 228b to the image time comparator 215 and to the respective cache 224a and 224b.

Based on the control of the image time comparator 215, each stream is adjusted in order to synchronise the timings of each to align.

Thus, the image time comparator module 215 receives the image on line 228a from the image recognition module 220a, and adjusts the appropriate stream by applying an adjustment signal on line 230a to the cache 224a. The image time comparator module 215 also receives the image on line 228b from the image recognition module 220b, and adjusts the appropriate stream by applying an adjustment signal on line 230b to the cache 224b.

The signals at the output of the first and second caches 224a and 224b on lines 226a and 226b respectively are thus time adjusted and aligned, and provide versions of the two streams—stream A and Stream B—which are synchronised with each other.

This can be further understood with reference to FIG. 3. It should be noted that in this description reference is made to a timing marker. This timing marker may also be referred to as a time reference. In general, the timing marker or time reference refers to a reference point which can be used to align streams.

Figure 3A:
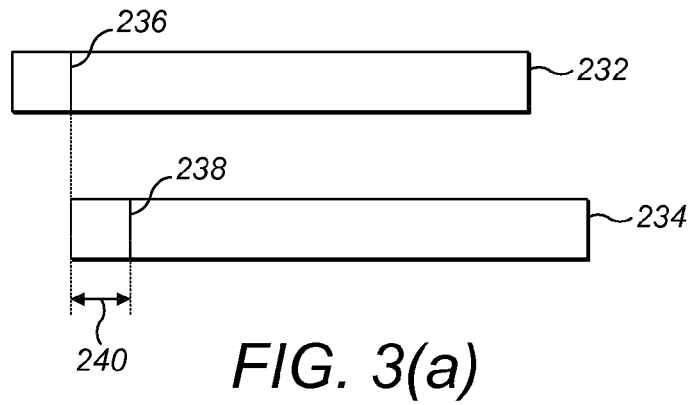
FIG. 3 illustrates an example implementation of time alignment for achieving synchronisation.

In FIG. 3(a), reference numeral 232 points to a segment of a first data stream, and reference numeral 234 points to a segment of a second data stream. Segment 232 has a timing mark 236, and segment 234 has a timing mark 238. In this example, each timing mark is a fixed distance (time distance) from the start of the segment. Thus the distance (time distance) 240 between the timing marks 236 and 238 denotes the timing misalignment between the two segments 240.

Figure 3B:
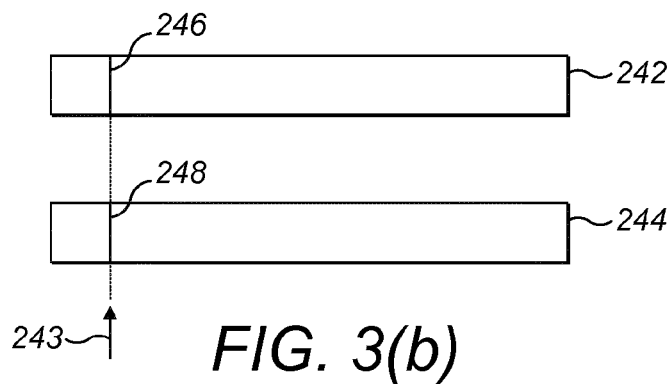

In accordance with the techniques as described with reference to FIG. 2, in FIG. 3(b) the segments 242 and 244 (corresponding to the segments 232 and 234) are aligned, and it can be seen that their respective timing markers 246 and 248 (which correspond to the timing markers 236 and 238) are aligned, as denoted by arrow 243.

Thus the timing of the segments is adjust so that their timing markers align, and as such the segments are in synchronism with each other.

Figure 4A:
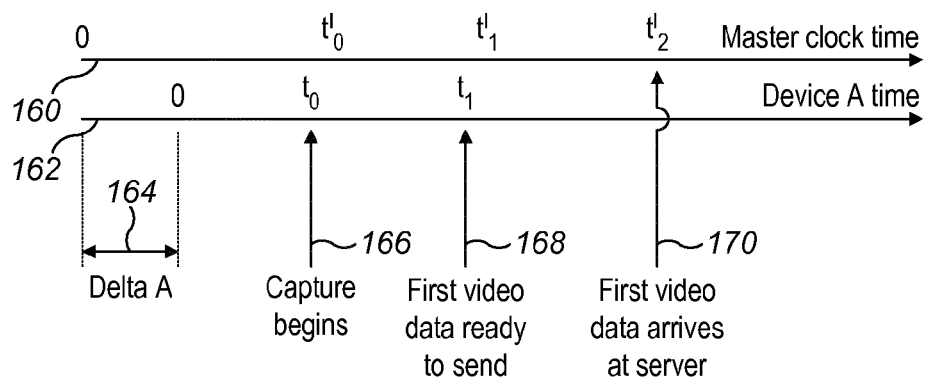
FIGS. 4(a) to 4(d) illustrate an example implementation of time alignment in accordance with examples.
Figure 4B:
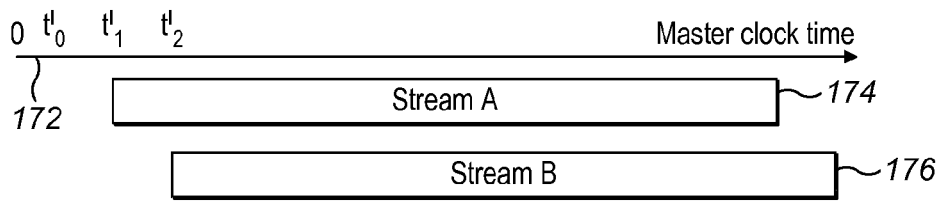
Figure 4C:
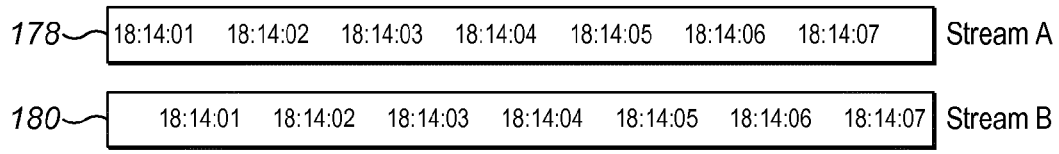
Figure 4D:
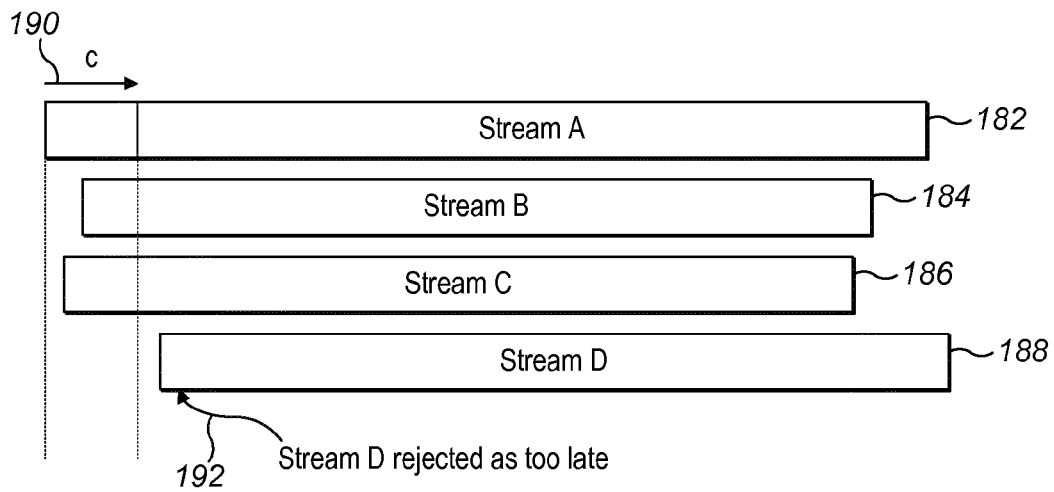
Figure 5:
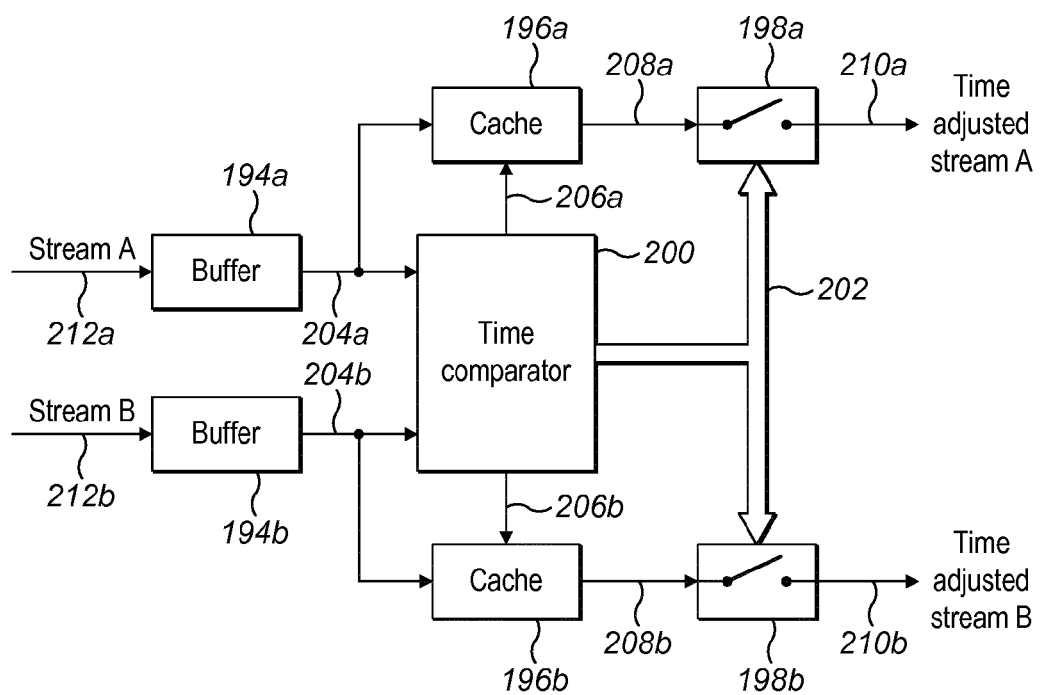
FIG. 5 illustrates an example implementation of a system for adjusting time alignment in accordance with the techniques of FIGS. 4(a) to 4(d)

As illustrated in FIGS. 4 and 5, the synchronisation of incoming streams at a streaming server may be dependent upon alignment of a master clock timing reference.

When a number of video capture devices are used to broadcast a single event by sending their video streams over a public network so that one or more viewers may watch the event and switch between camera angles to follow the action, a number of problems arise.

Firstly, in order to ensure that the streams are synchronised when presented to the viewer, it is important to know the exact moment at which each frame was captured. Using consumer devices that may or may not be operated by the same entity (they may be smart phones used by unrelated members of the public), there is no guarantee that the internal clock of each device is consistent with the next.

Moreover, by sending the video data over the open internet, there is no way to predict how timely the data's arrival at the server will be. This affects how the server can arrange for streams to be throttled or cached in order to align them.

There is described a solution addresses this alignment issue, subsequent documents will detail alternatives as well as further improvements which may be used with this technique or independently.

NTP is proposed to be used not to adjust the device's clock (which an application cannot do directly anyway), but to calculate an offset from a remote master clock. This adjustment value allows the application to mark its outbound content stream with its assessment of the master clock time at which each moment was captured. The term assessment is used because NTP is at best an approximation and, over the open internet may be no more than 10-100 ms accurate. At the better end of this range the accuracy is adequate for a 30-60 fps capture, but not at the other end of the scale.

Whatever the accuracy, the capture device may now mark up its output with a timeline which the receiving server may use. An application may update its synchronisation lock with the master clock periodically but there is no need to do this often. Doing so would create gaps or areas of compressed/stretched time in the marks added to the output. An initial fix on the time is all that is required.

This addresses therefore the problem of how to align streams coming from different sources—a secondary problem is using this data to create a synchronised output.

Consider an example. A consumer launches an application on device A. The first activity performed by device A is to contact a trusted time server and calculate its estimate of the difference between its own internal clock and a master clock. This difference is termed deltaA. The consumer begins to capture content using the application at time t0 (or t'0 according to the master clock). This data is timestamped as t'0 and processed into a format suitable for the server by which time it is t1 (or t'1 according to the master clock). The data is despatched over the network to the server, arriving there at t'2. Note that t'0 and t'1 are not aligned with t0 and t1. This is because A's assessment of deltaA is only an estimate and will be inaccurate to a certain degree as outlined above.

This timeline is shown in FIG. 4(a).

When the server receives this data it becomes available for others to watch and with only a single consumer device contributing content (Device A in this case), it does not matter how much time has elapsed between capturing each frame of video data and making it available on the server.

Now, consider the addition of a second camera, Device B. It starts up at some other points, performs its own assessment of its offset against the master clock and its user indicates that they want to contribute the video they capture to the same event as Device A.

In other words, when a viewer watches, it is now needed to ensure that content from Device A and Device B are in synchronism.

This is summarised in the second timeline of FIG. 4(b). This shows activity at the server and illustrates the first stream (Stream A) first arriving at the server at t'2 having commenced at t'0. Similarly the second stream (Stream B) is shown as first arriving at the server at t"2. The first frame of Stream B will, as all frames, carry a timestamp that indicates the time at which Device B believes it captured the frame according to its assessment of its offset from the master clock.

Imagine each stream is a ticker tape of master-clock times. When the server receives them and compares them as they arrive, they will look something like as shown in FIG. 4(c).

If the timestamps on Device B are ahead of Device A (i.e. it is taking Device A longer to get its data to the server), then Stream B can be cached long enough to be delivered alongside Stream A with the times synchronised.

In this way, the first device to join an event becomes the time controller for that event.

However, this causes a problem if Device A happens to be 'super-fast' at getting its data to the server which in turns makes it less likely that future devices will be ahead of it and therefore cacheable. Similarly, it has not yet been defined what happens if Stream B happens to be behind Stream A.

Consider therefore an adaptation to this strategy. When Stream A is first received by the server it is cached and held back for a time C such that its first frame is delayed by the maximum desired latency. If this latency period is L then the time for which Stream A should be held back is:

$$C = L - (t'2 - t'0)$$

(If C<0 then Stream A is run through as is)

Now, when streams arrive from any future contributors such as Device B, their timelines are compared to the adjusted timeline from Stream A and cached as needed. Any such stream which is still slower to get its data to the server is not allowed to join the synchronised event.

This is illustrated in FIG. 4(*d*).

Streams which are not allowed to join the synchronised event however are not rejected entirely. They continue to be tracked and, at such time as their delivery to the server falls within the required limits, their content is added to the event. Streams which fall behind after having been part of a synchronised event are temporarily excluded from the event if they fall further behind that the limits dictate. If Stream A falls behind its own adjusted timeline or stops completely, the server maintains a synthetic timeline against which all other streams continue to be tracked as though Stream A had continued.

For events that attract a large number of contributors, it may be desirable to maintain separate synchronisation shards each of which groups contributing streams that fall within particular bands of latency.

With reference to FIG. 5, there is illustrated further an example implementation in accordance with the foregoing description.

With reference to FIG. 5, the server 2 comprises in this example first and second buffers 194*a* and 194*b*, first and second caches 196*a* and 196*b*, a time comparator 200, and first and second switches 198*a* and 198*b*.

The streams are received in signal lines 212*a* and 212*b* and provided as inputs to the respective buffers 194*a* and 194*b*. Each buffer provides a respective output to a respective one of the first and second caches 196*a* and 196*b*, and to the time comparator 200.

The time comparator performs the analysis as discussed above, and outputs the streams from the first and second caches 196*a* and 196*b* under control of the respective generated control signals 196*a* and 196*b*. Time adjusted streams are then output on respective signals lines 208*a* and 208*b*.

The outputs on lines 2081 and 208*b* are input to respective switches 198*a* and 198*b*, which produce switch outputs on respective lines 210*a* and 210*b*.

The switches 198*a* and 198*b* are controlled by the time comparator 200 which produces a control signal on line 202. Under the control of the time comparator 200, the switches 198*a* and 198*b* selectively provide outputs on their output lines 210*a* and 210*b* respectively.

Figure 6:
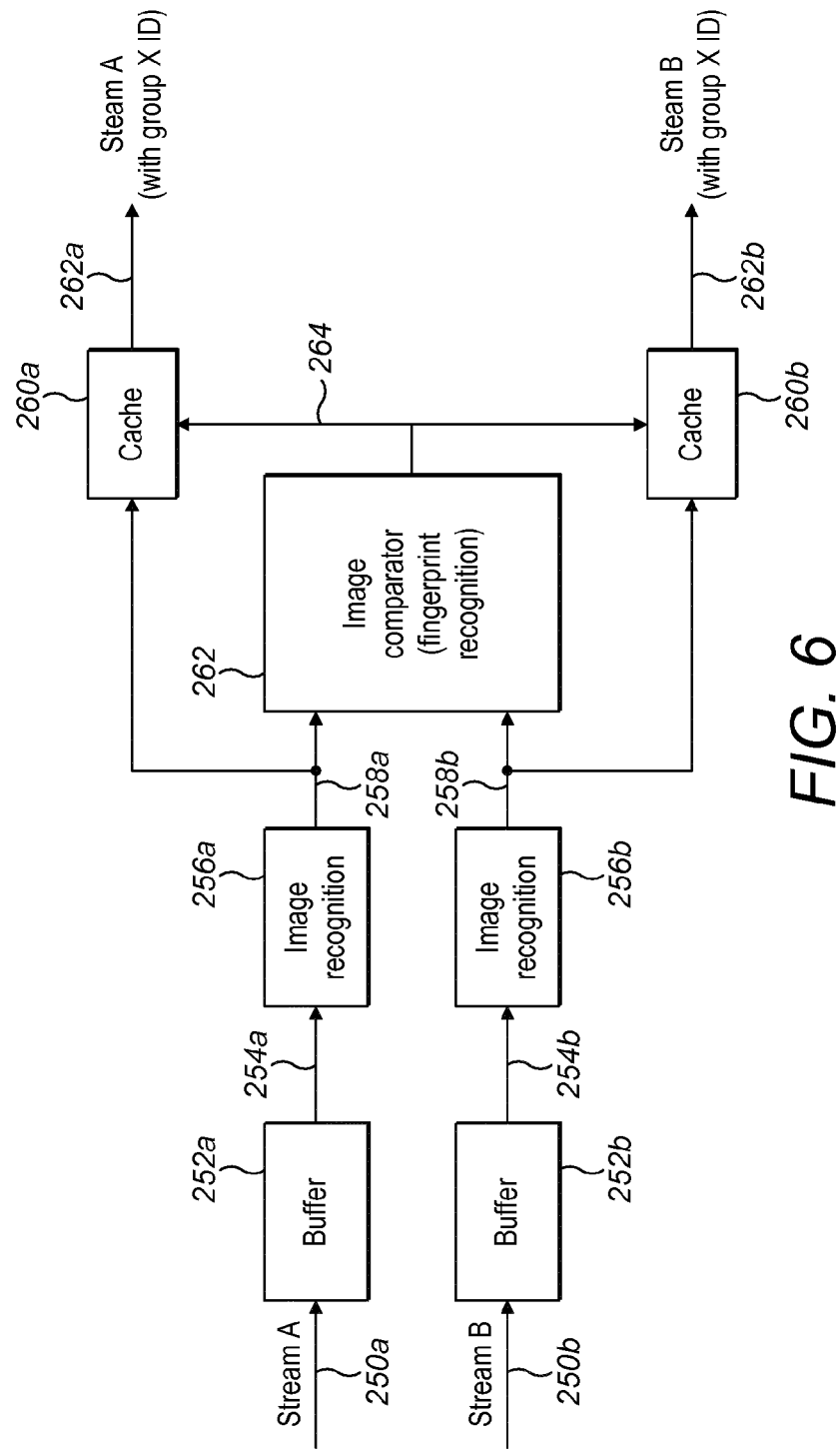
FIG. 6 illustrates an example implementation of a system for adjusting time alignment using fingerprint recognition.

As illustrated in FIG. 6, the synchronisation of incoming video streams may be based on a type of identification which may be exemplified by fingerprint recognition.

It may be desirable to link two or more mobile devices together so that they can collaborate on particular activities. For example the user of each device wants to participate in a shared gaming session or each device may be being used to contribute audio/video content to a conference call or similar. In each of these cases, and others, the association of devices in a group is ad-hoc in nature, in so much as the association only needs to last for the duration of the activity.

The requirement here is distinct from the solution offered by common device pairing techniques (such as those used by core Bluetooth) in two ways: (i) pairing creates a single link between two devices, it does not create a group of inter-linked devices; and (ii) such links are typically intended to be permanent (e.g. digital bathroom scales, Bluetooth mouse/keyboard, smart watch etc.). To the contrary, the challenge with this example is finding a technique that is not limited to single connections and which is flexible enough for casual, transient connections that have a bounded duration. The permanent linking offered by Bluetooth and other technologies is not suitable for these purposes because, being a long-lasting association, the amount of time the user has to expend creating the link is insignificant compared to the lifetime of the pairing. Spending a few minutes setting up the link is therefore not inconvenient, but spending this sort of time creating a pairing for an activity that itself only lasts a few minutes would be excessive.

All smartphones, most tablets and even some wearable devices are equipped with a microphone that an app can use to collect audio data from its surroundings. Similarly, there are well known techniques for processing audio data in order to derive a fingerprint from it. An audio fingerprint effectively condenses and summarises the detected sound in such a way that it is possible to compare it to other samples collected elsewhere or at other times.

A common use of these techniques is to sample an unknown audio source and compare it against a library of known fingerprints in order to identify the song, music, soundtrack etc. (e.g. Shazam and similar). However, fingerprinting is not limited technically to this use-case. It could, instead, arrange for two or more mobile devices to sample their surrounding ambient audio so that fingerprints derived from this information could be used to identify devices situated in the same environment.

For example, suppose there are devices X, Y and Z. The first two devices, X and Y, are in the same room while Z is elsewhere. Each device has an identical application installed, one function of which is to open the microphone and sample the audio it hears.

From this audio, each device periodically calculates a fingerprint which is submitted to a central server. This server processes the aggregate of this data from all devices and looks for submissions that have a high degree of similarity.

Such devices are notified of the other's existence with sufficient information that allows the user of each device to confirm or reject the association. The server may observe any number of devices which it believes are situated in the same environment and, as such, the association is not limited to a connection between two and only two devices.

A complicating factor of this system is timing. Clearly the server must only compare fingerprints derived from audio heard in the same moment. There is no value to the server identifying similarities between audio sampled at different times as this would not imply device proximity—quite the opposite in fact. Therefore, each device must also submit the starting timestamp for each calculated fingerprint and, of course, must sample over an identical duration. The stream of data from each device would therefore be a succession of fingerprints derived for back-to-back sections of detected audio.

Furthermore, to improve the matching quality it would be advantageous to ensure that each device begins its audio capture for each fingerprint calculation at the same moment. For example, an application captures audio in 10 second chunks, for each of which chunk it then calculates the fingerprint and submits it to the server.

If device X begins its first such sampling at 16:01:44 (perhaps when the application is launched) it will calculate a different set of fingerprints for the same background audio as Device Y, even though it is in the same room, unless device Y's sampling is in phase with device X's. To achieve this, all devices must be able to determine the offset between their internal clocks and a shared external clock. Sampling must then be done with reference to the shared clock to ensure each is in step with the other.

For an example the server provides a shared external clock. At a given moment, the server declares the current time to be 16:01:32 while device X's internal clock thinks it is 16:01:44 and device Y has 16:01:29. By whatever means, each device calculates it's offset from the shared external clock (device X=+12 s; device Y=−3 s) and uses this to create an internal representation of server time. Its sampling is then timed to coincide with 10 s boundaries of server time, i.e. at 16:01:40, 16:01:50, 16:02:00 etc. In this way, the fingerprints of each successive sampling from devices that are in the same environment will have a higher quality match than if the clocks were not in step.

Figure 7:
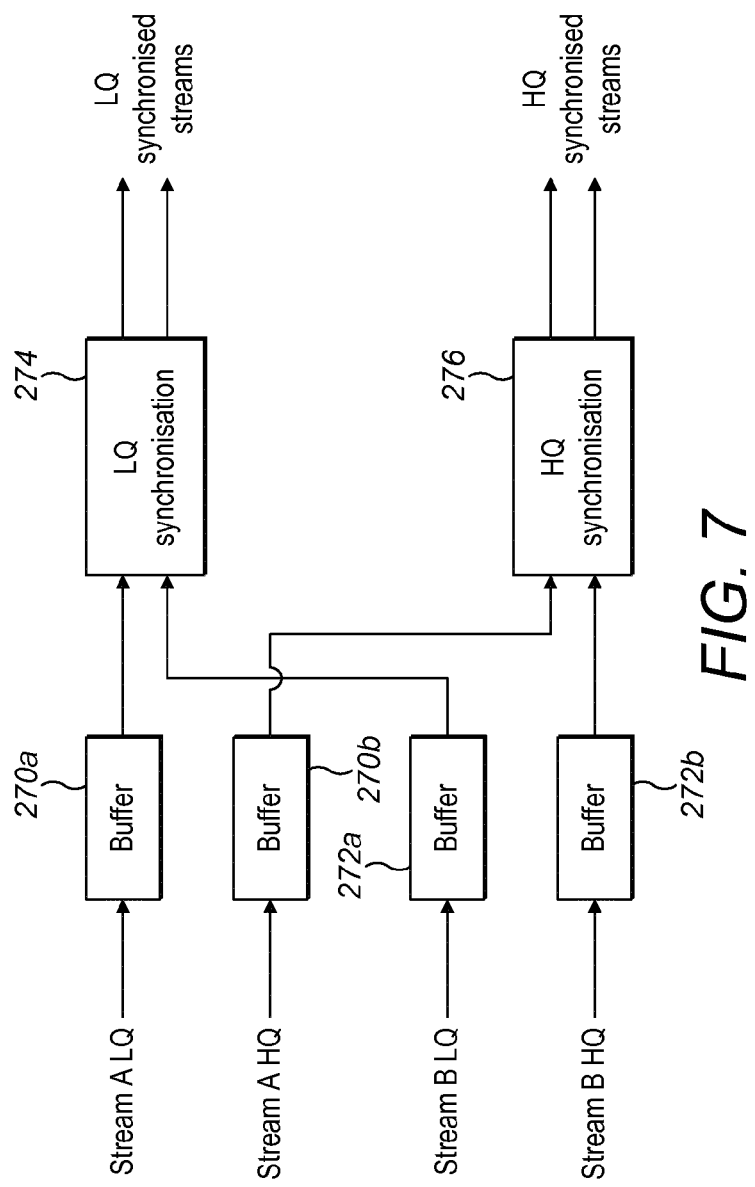
FIG. 7 illustrates an example implementation of synchronisation for streams being divided according to high and low quality.

A further example of synchronisation may be understood with relation to FIG. 7. This takes into account an understanding of the fact that capture devices may individually generate both low-quality and high-quality streams.

With reference to FIG. 7, the server is configured to include a buffer 270a for receiving a low quality version of stream A, a buffer 270b for receiving a high quality version of stream A, a buffer 272a for receiving a low quality version of stream B, a buffer 272b for receiving a high quality version of stream B, a low quality synchronisation module for receiving the low quality streams from buffers 270a and 272a, and a high quality synchronisation module for receiving the high quality streams from buffers 270b and 272b.

As illustrated in FIG. 7 a low-quality stream and high-quality stream is received from two distinct capture devices. The received low-quality stream from all capture devices is delivered to the low-quality synchronisation module 274, and the received high-quality stream from all capture devices are delivered to a high quality synchronisation module 276.

All low-quality streams are thus synchronised, and all high-quality streams are thus synchronised, and so there is provided a group of synchronised low-quality streams and a group of synchronised high-quality streams.

The synchronisation technique applied to either the group of low-quality streams or the group of high-quality streams may be in accordance with any synchronisation technique described herein, such as set out in and described with reference to any one of FIGS. 2 to 6.

In the examples as described the analysis in order to align incoming streams is carried out at the server. The capture devices may not know that their streams are being synchronised with any other streams.

All the examples and embodiments described herein may be implemented as processed in software. When implemented as processes in software, the processes (or methods) may be provided as executable code which, when run on a device having computer capability, implements a process or method as described. The execute code may be stored on a computer device, or may be stored on a memory and may be connected to or downloaded to a computer device.

Examples and embodiments are described herein, and any part of any example or embodiment may be combined with any part of any other example or embodiment. Parts of example are embodiments are not limited to being implemented in combination with a part of any other example or embodiment described. Features described are not limited to being only in the combination as presented.

The invention claimed is:

1. A system for providing streaming services, comprising:
   a plurality of capture devices, each for generating at least one stream of an event, each of the streams having a timestamp; and
   a server for analysing the plurality of generated streams and configured to:
   receive each of the streams having the timestamp from the plurality of capture devices;
   align each of the plurality of generated streams in time based on the time stamp of each stream;
   determine a section of each of the plurality of aligned streams, each section corresponding in time with respect to a timing reference, each section being of the same time duration, wherein for a given time period relative to the timing reference there is provided a single such section of each of the plurality of streams;
   recover a fingerprint from each section of each of the plurality of aligned streams, wherein the sections are each for a common time period relative to the timing period and have the same time duration;
   wherein the processor is further configured, for each successive section of the same time duration, to:
   identify a subset of the plurality of the streams having matching fingerprints within the sections having the same time duration and at the common time period relative to the timing reference; and
   group the identified subset of the plurality of the streams having matching fingerprints for the time duration of the common time period, wherein an independent grouping determination is made for different sections.

2. The system of claim 1 wherein the server is for processing the captured streams and generating at least one viewing stream, the system further comprising:
   at least one viewing device for receiving the at least one viewing stream.

3. The system of claim 1 wherein each capture device calculates an offset of its internal clock from a shared external clock to create an internal representation of time based on the shared external clock.

4. The system of claim 3 wherein a sampling of each capture device is timed to coincide with boundaries of its internal representation of time based on the shared external clock.

5. The system of claim 1 wherein one of a selection of the plurality of captured streams and segments of the plurality of captured streams from different capture devices associated with the same event are synchronised by the server.

6. The system of claim 1 wherein a sound signature is derived as the timing reference in each captured stream from each of the capture devices.

7. The system of claim 1 wherein a visual signature is derived as the timing reference in each captured stream from each of the capture devices.

8. The system of claim 1 wherein at least one of the capture devices generates two streams of one event, one of the two streams having a higher quality than the other of the two streams, wherein the two streams are each associated with a timing reference, and wherein a relative position of one of the two streams is aligned with a relative position of the other of the two streams at the server based on a derivation of respective timing marks at the server.

9. The system of claim 1 wherein the timing references each provide a time line for the captured streams, and wherein the server analysis aligns the time line for each of the captured streams, so that each of the captured streams is aligned.

10. A method for providing streaming services, comprising:
    generating at least one stream of an event from each of a plurality of capture devices, each of the streams having a timestamp;

receiving, at a server, each of the streams having the timestamp from the plurality of capture devices;

aligning, at the server, each of the plurality of generated streams in time based on the timestamp of each stream;

determining a section of each of the plurality of aligned streams, each section corresponding in time with respect to a timing reference and being of the same time duration, wherein for a given time period relative to the timing reference there is provided a single such section of each of the plurality of streams;

recovering a fingerprint from each of the section of each of the plurality of aligned streams, which section of each stream is for a common time period relative to the timing period of the same time duration;

identifying, for each successive section of the same time duration, a subset of the plurality of the streams having matching fingerprints in sections of the same time duration at the common time period relative to the timing reference; and grouping, for each successive section of the same time duration, the identified subset of the plurality of the streams having matching fingerprints in the sections for the time duration of the common time period, wherein an independent grouping determination is made for each successive section.

11. The method of claim 10 further comprising:
processing the captured streams and generating at least one viewing stream; and
receiving at least one viewing stream at one or more viewing devices.

12. The method of claim 10 further comprising:
calculating at each capture device an offset of its internal clock from a shared external clock to create an internal representation of time based on the shared external clock.

13. The method of claim 12 wherein a sampling of each capture device is timed to coincide with boundaries of its internal representation of time.

14. The method of claim 10 wherein one of a selection of the plurality of captured streams and segments of the plurality of captured streams from different capture devices associated with the same event are synchronised by the server.

15. The method of claim 10 wherein a sound signature is derived as a timing reference in each captured stream from each of the capture devices.

16. The method of claim 10 wherein a visual signature is derived as a timing reference in each captured stream from each of the capture devices.

17. The method of claim 12 further comprising:
generating at at least one of the capture devices two streams of one event, one of the two streams having a higher quality than the other of the two streams, wherein the two streams are each associated with a timing reference, the server being configured to align a position of one of the two streams with respect to a position of the other of the two streams.

18. The method of claim 10 further comprising:
providing a time line for the captured streams with the timing references, and analysing the time line for each of the captured streams to align each of the captured streams.

19. The system of claim 1 wherein the association of the streams identifies a subset of the capture devices situated in the same environment such that the fingerprint is used to associate the subset of capture devices.

20. The method of claim 10 wherein the association of the streams identifies a subset of the capture devices situated in the same environment such that the fingerprint is used to associate the subset of capture devices.

* * * * *